United States Patent
Thomas et al.

(10) Patent No.: US 9,052,899 B2
(45) Date of Patent: Jun. 9, 2015

(54) IDLE POWER REDUCTION FOR MEMORY SUBSYSTEMS

(75) Inventors: Tessil Thomas, Bangalore (IN); Baskaran Ganesan, Bangalore (IN); Sampath Dakshinamurthy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 13/206,888

(22) Filed: Aug. 10, 2011

(65) Prior Publication Data

US 2013/0042127 A1 Feb. 14, 2013

(51) Int. Cl.
G06F 1/32 (2006.01)
G06F 1/26 (2006.01)

(52) U.S. Cl.
CPC ............ *G06F 1/3225* (2013.01); *G06F 1/3206* (2013.01); *G06F 1/26* (2013.01); *G06F 1/3203* (2013.01); *G06F 1/3237* (2013.01); *G06F 1/3275* (2013.01); *Y02B 60/1225* (2013.01); *Y02B 60/32* (2013.01); *Y02B 60/1228* (2013.01); *Y02B 60/1221* (2013.01)

(58) Field of Classification Search
CPC ........ G06F 1/3203; G06F 1/26; G06F 1/3206
USPC ........................................................ 713/323
See application file for complete search history.

(56) References Cited

U.S. PATENT DOCUMENTS

| | | | |
|---|---|---|---|
| 7,761,696 B1 | 7/2010 | Bhattacharyya et al. | |
| 2008/0235528 A1* | 9/2008 | Kim et al. | 713/324 |
| 2010/0244573 A1 | 9/2010 | Karnick et al. | |
| 2012/0102344 A1* | 4/2012 | Kocev et al. | 713/322 |
| 2012/0311360 A1 | 12/2012 | Balasubramaniam et al. | |

* cited by examiner

*Primary Examiner* — Jaweed A Abbaszadeh
*Assistant Examiner* — Austin Hicks
(74) *Attorney, Agent, or Firm* — Blakely, Sokoloff, Taylor & Zafman LLP

(57) ABSTRACT

Embodiments of the invention describe systems and processes directed towards reducing memory subsystem idle power consumption. Embodiments of the invention enable low power states for various components of a memory subsystem under certain operating conditions, and exiting said low power states under certain operating conditions.

Embodiments of the invention may comprise of logic, modules or any combination thereof, to detect operating conditions in a computing system. Some of these operating conditions may include, but are not limited to, a memory controller being empty of transactions directed towards its respective memory unit(s), a processor core executing a processor low-power mode, and a processor socket (operatively coupling the processing core and the memory unit) executing an idle mode. In response to detecting said operating conditions, embodiments of the invention may execute a low-power idle state for the memory unit(s) and various components of the memory subsystem.

18 Claims, 5 Drawing Sheets

IDLE POWER REDUCTION FOR MEMORY SUBSYSTEMS

FIELD

Embodiments of the invention generally pertain to computing devices and more particularly to memory system power consumption.

BACKGROUND

Increasing workload demands have created the need for high capacity, high performance memory subsystems in system platforms. Memory subsystems in multi-processor (or multi-core) servers, such as 4-socket and 8-socket server configurations, typically include large amounts of main memory capacity.

Current high capacity memory subsystem solutions result in high power consumption even when the system platform is completely idle. The result is that memory subsystem idle power is a significant component of the overall system platform idle power consumption. There is an increasing demand for significant reduction in system platform idle power consumption. What is needed is a solution to reduce the memory subsystem idle power consumption, and thereby reducing the overall system platform idle power consumption, without sacrificing memory performance.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe systems and processes directed towards reducing memory subsystem idle power consumption. Embodiments of the invention enable low power states for various components of a memory subsystem under certain operating conditions. Embodiments of the invention similarly describe exiting low power states for various components of a memory subsystem upon detecting certain operating conditions.

Embodiments of the invention may comprise logic, modules or any combination thereof, to detect operating conditions in a computing system. Some of these operating conditions may include, but are not limited to, a memory controller being empty of transactions directed towards a memory unit, a processor core executing a processor low-power mode, and a processor socket (operatively coupling the processing core and the memory unit) executing an idle mode. In response to detecting said operating conditions, embodiments of the invention may execute a low-power idle state for the memory unit and various components of the memory subsystem.

It is to be understood, in view of the example embodiments described below, that system platforms implementing embodiments of the invention consume less power during system idle time compared to prior art solutions. Furthermore, by having an efficient exit solution for the low power idle state, the performance of memory subsystems incorporating embodiments of the invention will not be affected.

Figure 1:
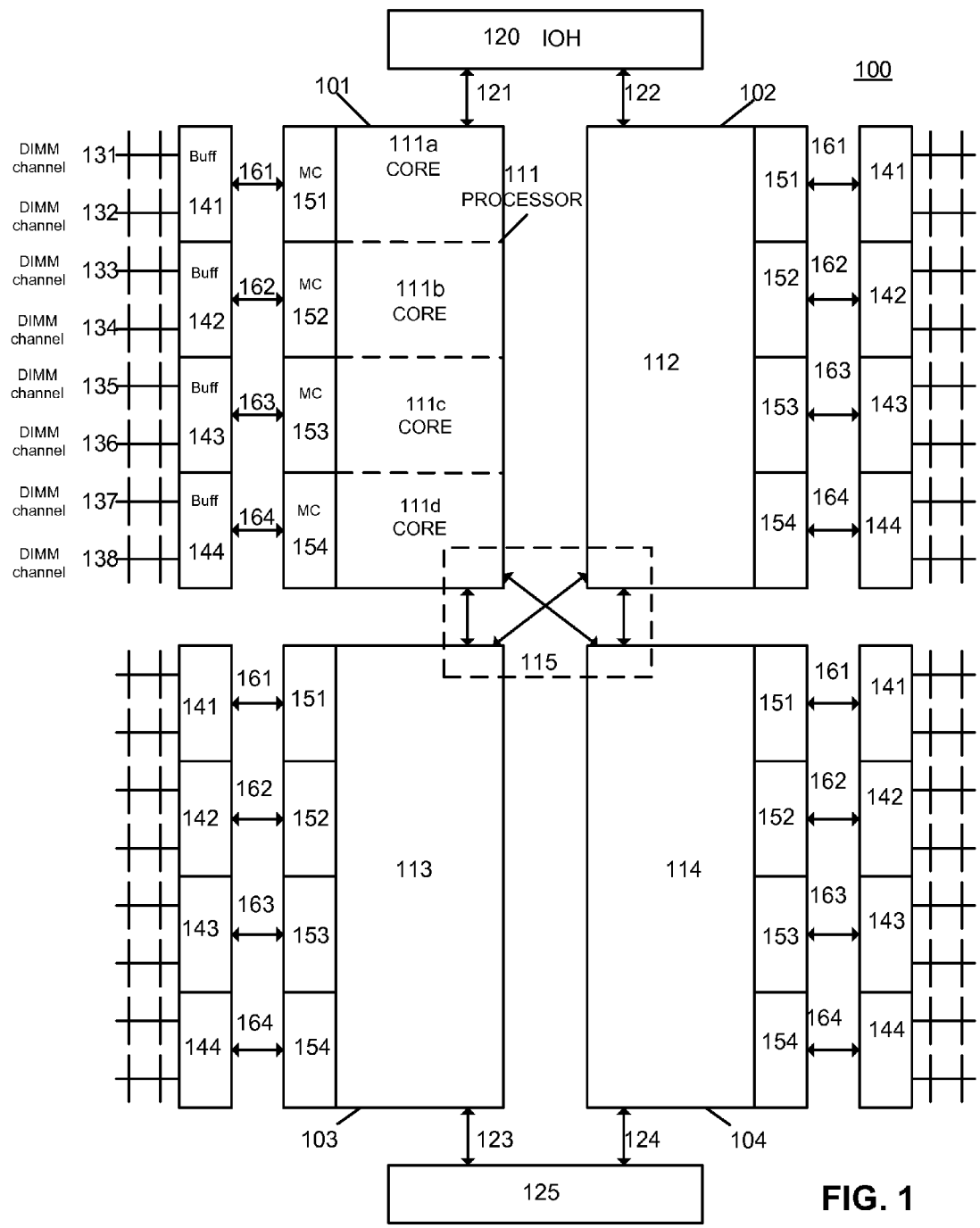
FIG. 1 is a block diagram of a server platform implementing an embodiment of the invention.

FIG. 1 is a block diagram of an embodiment of the invention. In this embodiment, system 100 is a 4 socket server platform, including processor sockets 101, 102, 103 and 104. Each socket may mechanically and operatively couple a multi-core processor to other components of system 100 (either shown in FIG. 1, or otherwise). In this embodiment, processor 111 utilizes socket 101, processor 112 utilizes socket 102, processor 113 utilizes socket 103 and processor 114 utilizes socket 104. Processor 111 is shown to comprise of cores 111a, 111b, 111c and 111d; it is to be understood that although not shown in the same level of detail, processors 112-114 each comprise 4-core processors in this embodiment. Processors 111-114 (i.e., the cores of each processor) may exchange data via socket-to-socket links 115.

In this embodiment, processors 111 and 112 are coupled to input/output hub (IOH) 120 via point-to-point links 121 and 122, respectively, while processors 113 and 114 are coupled to IOH 125 via point-to-point links 123 and 124, respectively. IOH 120 and IOH 125 provide connectivity between processors 111-114 and input/output (I/O) devices utilized by system 100 (not shown).

System 100 as illustrated is shown to have a large memory capacity. In this embodiment, each socket is assigned 8 memory channels—thus, each core of processors 111-114 is assigned two channels of memory devices (e.g., channels comprising dual inline memory modules (DIMMs) consistent with the JEDEC Double Data Rate (DDR3) dynamic random access memory (DRAM) standard, published July 2010), or any functional equivalent).

Thus, core 111a is assigned DIMM channels 131 and 132, core 111b is assigned DIMM channels 133 and 134, core 111c is assigned DIMM channels 135 and 136, and core 111d is assigned DIMM channels 137 and 138. Core 111a will access its DIMM channels via memory controller 151, core 111b will access its DIMM channels via memory controller 152, core 111c will access its DIMM channels via memory controller 153, and core 111d will access its DIMM channels via memory controller 154. The cores of processors 112-114 are shown to be similarly assigned to other channels of DIMMs in system 100 (the associated DIMM channels, memory bus expander buffers, memory controllers, links, etc. for processors 112-114 are not provided with reference numbers for the sake of ease of drawing).

It is to be understood that in some embodiments, sockets 101-104 may each have a limited number of CPU socket pins; thus, in order to accommodate a large memory capacity with a limited number of CPU socket pins, memory bus expander buffers may be used. In this example, memory bus expander buffer 141 is coupled to DIMM channels 131 and 132, buffer 142 is coupled to DIMM channels 133 and 134, buffer 143 is coupled to DIMM channels 135 and 136, and buffer 144 is coupled to DIMM channels 137 and 138. Other memory bus expanders utilized by system 100 are shown to be similarly connected to two DIMM memory channels. Each DIMM memory channel as illustrated in FIG. 1 is shown to have two memory devices. This is shown only as an example of a plurality of memory devices on a channel; it is understood that each memory channel may comprise many more memory devices.

In this embodiment, the memory bus expander buffers of system 100 may be connected to their respective processor cores via high speed serial links; for example, buffer 141 is shown to be coupled to core 111a via link 161, buffer 142 is shown to be coupled to core 111b via link 162, buffer 143 is shown to be coupled to core 111c via link 163, and buffer 144 is shown to be coupled to core 111d via link 164. Said links may obey, for example, the Scalable Memory Interface (SMI) protocol which has a low pin count requirement.

It is to be understood that the combination of high memory capacity, memory bus expander buffers, and high speed serial links may result in high power consumption even when system platform 100 is completely idle. Thus, system 100 may incorporate embodiments of the invention to reduce system memory idle power consumption by having various components of the memory subsystem enter and exit low power states based on various operating conditions.

Figure 2:
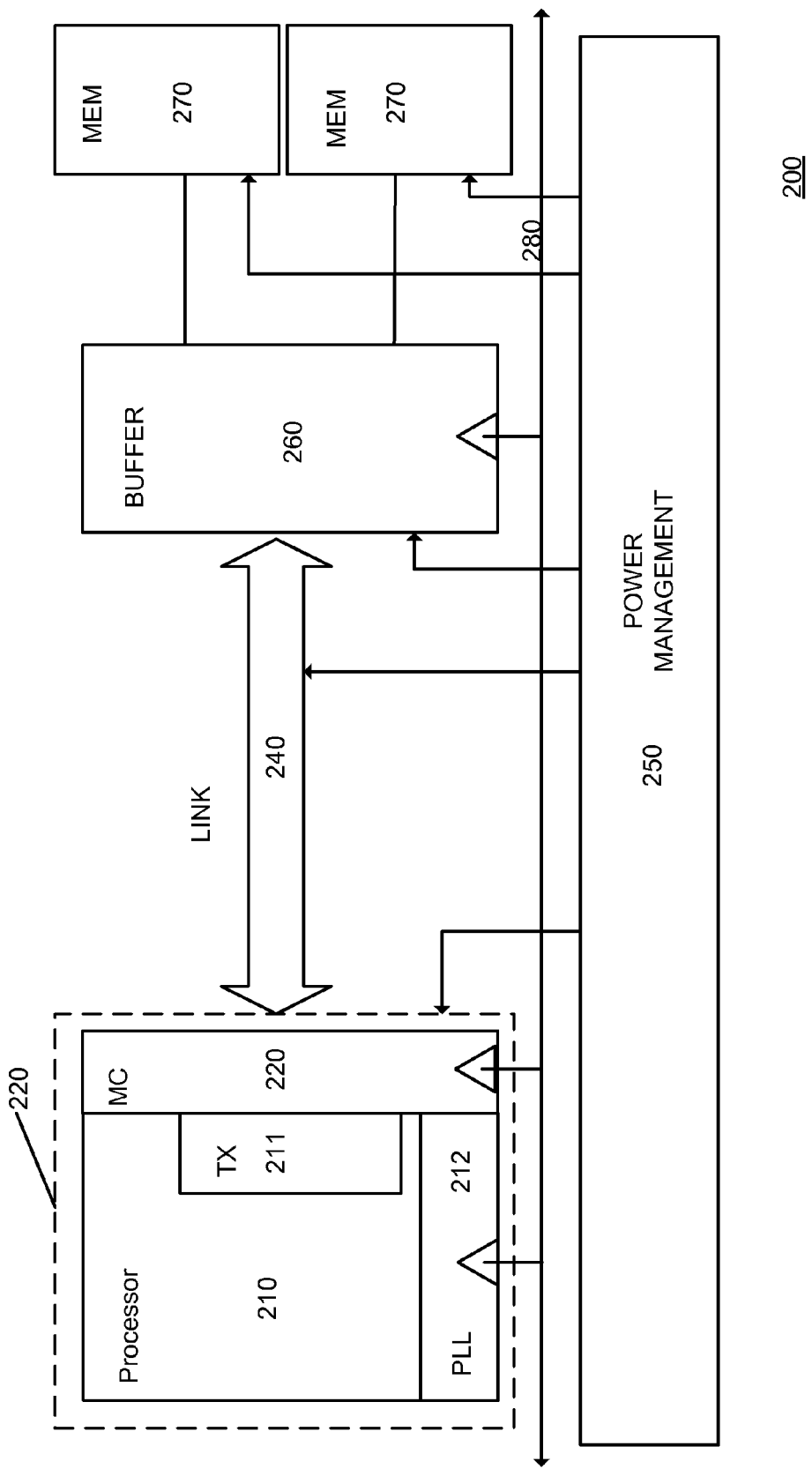
FIG. 2 is a block diagram of an embodiment of the invention.

FIG. 2 is a block diagram of an embodiment of the invention. In this embodiment, memory subsystem 200 is shown to include processor 210 coupled to the subsystem via socket 202. It is to be understood that processor 210 may be a single-core processor, or a core included in a multi-core processor (wherein other cores of the multi-core processor are coupled to the system platform via socket 202).

Processor 210 is shown to have a physical player (PHY) including transmission (TX) drivers 211 to drive output data from the processor, and phase lock loop (PLL) circuitry 212 to control an input clock signal for the processor (i.e., receiving a clock signal from system clock 280).

Processor 210 is further shown to execute memory controller module 220 to control data transferred to and from memory units 270. It is to be understood that in other embodiments, the memory controller may be logic/circuitry outside of processor 210. Memory bus expander buffer 260 is an interface for processor 210 to access DIMM channels 270 as described above. Processor 210 may receive data from buffer 260 via high speed serial link 240.

In this embodiment, memory subsystem 200 includes memory power management module 250 to execute a low-power idle state for various components of the subsystem in response to detecting a plurality of operating conditions. These conditions may include, for example, detecting that memory controller 220 is empty of transactions directed towards memory units 270; that processor 210 is executing a processor low-power mode; and that socket 202 is executing an idle mode. In embodiments where multi-core processors are utilized by the system platform, all processing cores of the respective multi-core processor may be required to be executing a processor low-power mode. In systems where multiple low-power modes may exist for a processor, embodiments of the invention may detect a specific low-power mode (e.g., a low-power mode that is exited in response to a system event, rather than a time-out).

In one embodiment of the invention, memory power management module 250, in response to detecting any combination of the above described operating conditions, executes a low power state. Said low power state may include the execution of operations to disable an input clock signal (alternatively referred to herein as "clock-gating") for memory controller 220. It is to be understood that such "clock-gating" operations would conserve power by preventing the sequential circuits of memory controller from switching states. Thus, memory controller 220 is disabled and prevented from processing transactions while other components are executing low-power idle states.

In one embodiment, the low-power state executed by memory power management module 250 may further execute operations to disable TX drivers 211, the input clock signal for processor 210, and PLL circuitry 212 in response to detecting the above described operating conditions. It is to be understood that such operations reduce the amount of power processor 210 consumes in the low power state.

In one embodiment of the invention, memory power management module may further execute operations to disable high speed serial link 240 and disable an input clock signal for memory bus expander buffer 260 in response to detecting the plurality of operating conditions. It is to be understood that such operations reduce the amount of power the components would consume in the low power state.

In the event that memory units 270 execute refresh operations to maintain their data integrity (e.g., memory units 270 comprise DRAM), memory power management module 250 may further direct the DRAM memory to execute a self-refresh mode in response to detecting the plurality of operating conditions. It is to be understood that such operations would maintain the data integrity of memory units 270 in the low power state without requiring memory controller 220 to manage the necessary refresh operations. In some embodiments, memory units 270 may comprise registered memory. Memory power management module 250 may further execute operations to disable an input clock signal for the register of each memory unit in response to detecting the plurality of operating conditions in order to further reduce the amount of power consumed by memory units 270 in the low power state.

Thus, memory power management module 250 is shown to execute a low-power state for memory subsystem 200 in response to detecting certain operating conditions. It is to be understood that said low-power state may include any combination of the above described examples, thereby reducing memory subsystem idle power consumption compared to prior art solutions.

Figure 3A:
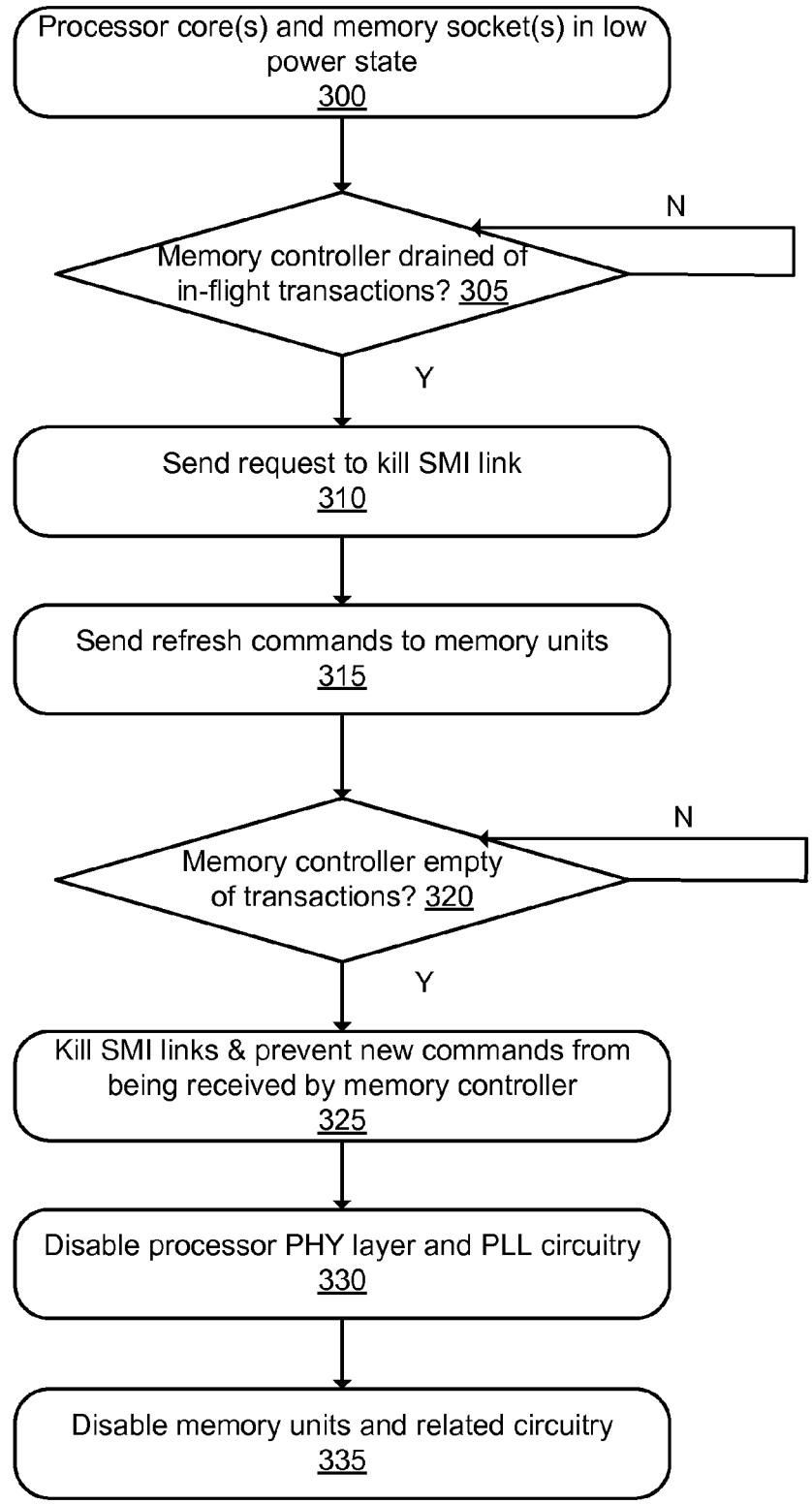
FIG. 3A and FIG. 3B are flow diagrams illustrating embodiments of the invention

FIG. 3A is a flow diagram illustrating an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

All processing cores in a computing system, and all associated memory sockets, are determined to be in a low power state, 300. A system memory controller is queried to determine if it has been drained of all in-flight (i.e., pending) transactions, 305. If so, a request to disable (i.e., kill) the SMI links between processing cores and memory units may be sent to the memory controller, 310. The memory controller may further quiesce the ranks (i.e., channels) of memory units by sending refresh commands to all populated ranks, 315.

Any transactions in the memory controller will be processed, 320; however, if the memory controller is emptied, a low power state for the memory subsystem may be initiated. The memory controller may process the request to disable the SMI links, and prevent new commands from being issued to the memory controller 325. In some embodiments, the memory controller will be "clock gated."

Circuitry related to data transmissions to/from the processor may further be disabled, 330. In one embodiment, TX drivers are shutdown, while PLL circuitry of the processor is clock gated.

Memory unit components may further be disabled, 335, In one embodiment, core logic of the memory bus expander buffer is clock gated, I/O circuitry and any link circuitry between the memory and the processor is shut down, and (if needed) the memory is placed in a self-refresh state.

Figure 3B:
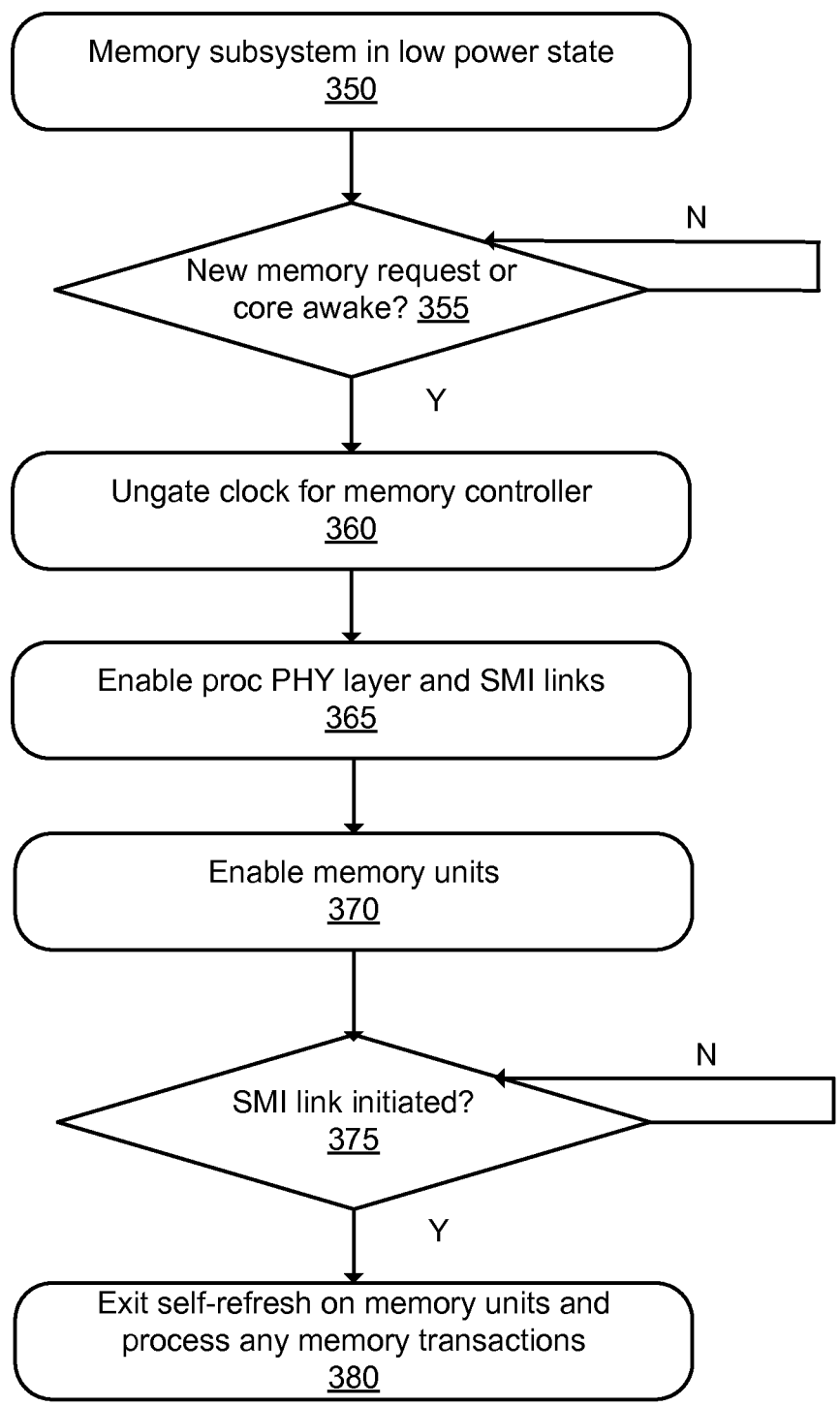

Thus the above operations describe how a memory subsystem may enter a low power state, and operations said low power state may include. FIG. 3B is a flow diagram illustrating an embodiment of the invention for exiting a low power state for a memory subsystem. When the memory subsystem is in a low power state (e.g., any low power state described above), 350, it is determined whether an exit condition has occurred. In this embodiment, an exit condition occurs if there are new memory requests, or if a processing core has exited a low power state, 355. If there are no new memory access requests and all processing cores are in a low power state, the memory subsystem continues to execute a low power state. Otherwise, the input clock signal of the memory controller may be ungated, 360, circuitry related to data transmissions to/from the processor may be enabled, 365, and memory unit components and related circuitry may further be enabled, 370.

It is then determined if the high speed serial link has been initialized, 375. If so, the DRAM memory ranks are configured to exit self-refresh and the memory controller will process transactions as they are received, 380.

Figure 4:
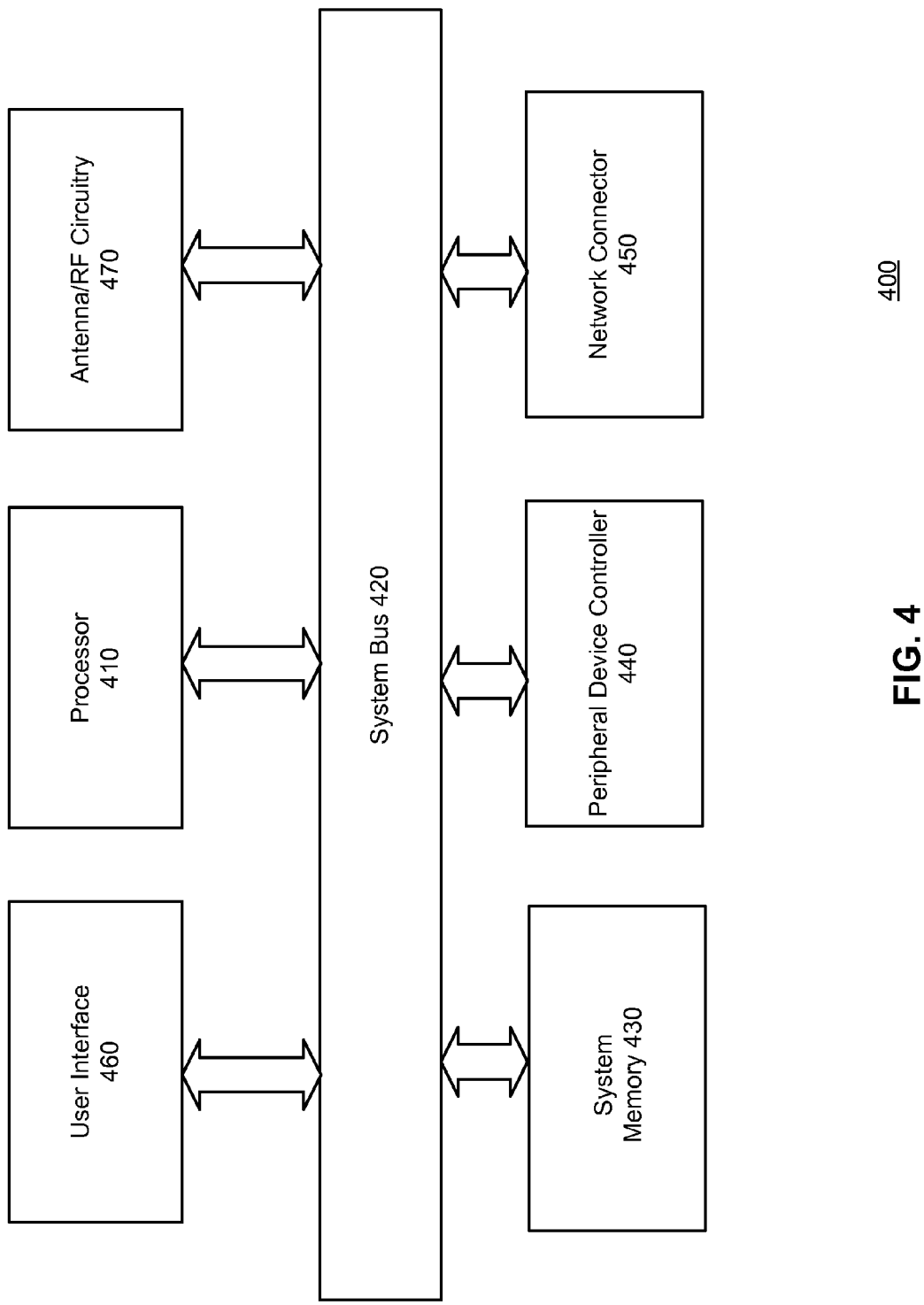
FIG. 4 is block diagram of a system that may utilize an embodiment of the invention.

FIG. 4 is block diagram of a system that may utilize an embodiment of the invention. System 400 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 400 may include processor 410 to exchange data, via system bus 420, with user interface 460, system memory 430, peripheral device controller 440 and network connector 450. System memory 430 comprises volatile and non-volatile memory and may be included in a memory subsystem according to any of the above described embodiments of the invention wherein the memory subsystem may enter a low-power state. Thus, system 400 will have a lower idle power consumption compared to systems employing prior art system memory solutions.

System 400 may further include antenna and RF circuitry 470 to send and receive signals to be processed by the various elements of system 400. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 400 may include multiple physical antennas.

While shown to be separate from network connector 450, it is to be understood that in other embodiments, antenna and RF circuitry 470 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   a multiple processor;
   a system memory unit, the system memory unit having a first memory region and a second memory region, the first memory region being architecturally closer to the multiple processors than the second memory region;
   a memory controller coupled to the first memory region to control data transferred to and from the second memory region;
   a memory power management module to help execute a low-power idle state entrance process for the system memory unit, the entrance process including:
   detecting that the multiple processors are in a low power state;
   in response to the detecting, inquiring the memory controller whether the memory controller is empty of in-flight transactions directed towards the system memory unit;
   in response to the memory controller responding that the memory controller is empty of in-flight transactions, sending a request to the memory controller to kill a link between the memory controller and the first memory region;
   the memory controller, in response to receiving the request, initiating idling of the second memory region and then, after the memory controller is empty of transactions, killing the link and placing itself in a low power state in which it is unable to receive transactions from the multiple processors;

an I/O unit to accept/transmit information to/from the system.

2. The system of claim 1, the memory power management module is to further disable an input clock signal for the memory controller after the memory controller is empty of transactions.

3. The system of claim 1, the multiple processors are included in a processor package further including:
transmission (TX) drivers to drive output data from the multiple processors;
and phase lock loop (PLL) circuitry to control an input clock signal for the multiple processors;
the memory power management module to further disable the TX drivers, the input clock signal for the processor, and the PLL circuitry after the memory controller is empty of transactions.

4. The system of claim 1, wherein the first memory region is implemented as a buffer that is architecturally between the memory controller and the second memory region.

5. The system of claim 1, wherein the second memory region comprises DRAM memory, and the initiating of the idling includes directing the DRAM memory to execute a self-refresh mode.

6. The system of claim 1, wherein the memory power management module is to further disable an input clock signal for a memory register after the memory controller is empty of transactions.

7. The system of claim 1, the memory power management module is to exit the entrance process in response to detecting at least one of a transaction directed towards the memory unit;
The multiple processors exiting the processor low-power mode.

8. A method comprising:
entering a low power idle state in a computer system, the entering including:
detecting that a processor core is in a low-power mode;
in response to the detecting that the processor is in a low-power mode, inquiring into a memory controller whether the memory controller is empty of in-flight transactions directed to a system memory unit comprising a first memory region and a second memory region, the first memory region being architecturally closer to the processor core than the second memory region;
in response to the memory controller responding that the memory controller is empty of in-flight transactions, sending a request to the memory controller to kill a link between the memory controller and the first memory region;
the memory controller, in response to receiving the request, initiating idling of the second memory region and then, after the memory controller is empty of transactions, killing the link and placing itself in a low power state in which it is unable to receive transactions from the processor core.

9. The method of claim 8, further comprising:
disabling an input clock signal for the memory controller after the memory controller is empty of transactions.

10. The method of claim 8, the processor core included in a processor package further including transmission (TX) drivers to drive output data from the processor core, and phase lock loop (PLL) circuitry to control an input clock signal for the processor core, the method further comprising:
disabling the TX drivers, the input clock signal for the processor core, and the PLL circuitry after the memory controller is empty of transactions.

11. The method of claim 8, further comprising:
causing the memory controller to no longer receive new commands after the memory controller is empty of transactions.

12. The method of claim 8, wherein the first memory region is a memory buffer.

13. The method of claim 8, wherein the second memory region comprises DRAM memory, the initiating of the idling of the second memory region further comprising:
directing the DRAM memory to execute a self-refresh mode.

14. The method of claim 8, further comprising:
exiting the low-power idle state for the memory unit in response to detecting at least one of a transaction directed towards the memory unit, and the processor core exiting the processor low-power mode.

15. An apparatus comprising:
a memory unit comprising a first memory region and a second memory region;
a processor core, the first memory region being architecturally closer to the processor core than the second memory region;
a socket operatively coupling the processor core and the memory unit;
a memory controller coupled to the memory unit;
and logic to perform the following in order to enter a low power idle state:
detect that the processor core is in a low-power mode;
in response to the detecting that the processor core is in a low-power mode, inquire into a memory controller whether the memory controller is empty of in-flight transactions;
in response to the memory controller responding that the memory controller is empty of in-flight transactions, send a request to the memory controller to kill a link between the memory controller and the first memory region;
wherein, the memory controller, in response to receiving the request, initializes idling of the second memory region and then, after the memory controller is empty of transactions, kills the link and places itself in a low power state in which it is unable to receive transactions from the processor core.

16. The apparatus of 15, wherein the logic is to further:
exit the low-power state for the memory unit in response to detecting at least one of a transaction directed towards the memory unit, and the processor core exiting the low-power mode.

17. The apparatus of claim 15, wherein the processor core comprises a multi-core processor, wherein the logic is to perform the inquiring into the memory controller in response to detecting all processing cores of the multi-core processor are executing a low-power mode.

18. The apparatus of claim 15, wherein the initiating of the idling further comprises:
directing a DRAM memory to execute a self-refresh mode.

* * * * *